US008281985B1

(12) United States Patent
Steinmetz et al.

(10) Patent No.: US 8,281,985 B1
(45) Date of Patent: Oct. 9, 2012

(54) CARD ACTIVATED CASH DISPENSING AUTOMATED BANKING MACHINE CUSTOMIZATION SYSTEM AND METHOD

(75) Inventors: Richard A. Steinmetz, Lake Mary, FL (US); Richard P. Brunt, Westfield, MA (US); James Meek, North Canton, OH (US); Charles E. Ducey, Jr., North Canton, OH (US); Victor A. Cogan, Amherst, OH (US)

(73) Assignee: Diebold Self-Service Systems, North Canton, OH (US)

( * ) Notice: Subject to any disclaimer, the term of this patent is extended or adjusted under 35 U.S.C. 154(b) by 1324 days.

(21) Appl. No.: 12/004,759

(22) Filed: Dec. 21, 2007

Related U.S. Application Data (60) Provisional application No. 60/877,590, filed on Dec. 27, 2006.

(51) Int. Cl.
*G07F 19/00* (2006.01)
*G06K 5/00* (2006.01)
*G06F 7/08* (2006.01)
*G06Q 10/00* (2006.01)
*G06Q 40/00* (2006.01)

(52) U.S. Cl. ............ 235/379; 235/380; 235/381; 705/1; 705/35; 705/43

(58) Field of Classification Search .................. 235/375, 235/379–382; 705/1, 16, 17, 35, 39, 43
See application file for complete search history.

(56) References Cited

U.S. PATENT DOCUMENTS

| | | | |
|---|---|---|---|
| 6,191,780 B1 * | 2/2001 | Martin et al. ................. | 715/201 |
| 6,672,505 B1 * | 1/2004 | Steinmetz et al. ............ | 235/379 |
| 6,964,368 B1 * | 11/2005 | Trelawney et al. ........... | 235/379 |
| 7,063,253 B1 * | 6/2006 | Brausch et al. ............... | 235/379 |
| 7,577,615 B1 * | 8/2009 | Steinmetz et al. ............. | 705/44 |
| 7,802,246 B1 * | 9/2010 | Kennedy et al. .............. | 717/173 |
| 7,988,041 B1 * | 8/2011 | Bowen et al. ................. | 235/379 |
| 2007/0150749 A1 * | 6/2007 | Monaghan et al. ........... | 713/189 |
| 2007/0168947 A1 * | 7/2007 | Halbedel et al. .............. | 717/110 |

* cited by examiner

*Primary Examiner* — Thien M. Le
*Assistant Examiner* — April Taylor
(74) *Attorney, Agent, or Firm* — Christopher L. Parmelee; Ralph E. Jocke; Walker & Jocke (57) ABSTRACT

A card activated cash dispensing automated banking machine operates responsive to data included on user cards. A system and method for producing the automated banking machine incorporating a plurality of hardware devices in the automated banking machine responsive to order data associated with a purchase order for the automated banking machine. The hardware devices include a card reader, a cash dispenser, at least one processor, at least one hard drive, and at least one output device. The order data includes at least one hardware part number corresponding to at least one of the devices, at least one software part number corresponding to at least one software component, and at least one customization part number corresponding to at least one customization file. The system and method include installing the software component and the customization file on the at least one hard drive of the machine, through operation of the at least one server responsive to the order data.

22 Claims, 3 Drawing Sheets

CARD ACTIVATED CASH DISPENSING AUTOMATED BANKING MACHINE CUSTOMIZATION SYSTEM AND METHOD

CROSS REFERENCE TO RELATED APPLICATIONS

This application claims benefit of U.S. Provisional Application Ser. No. 60/877,590 filed Dec. 27, 2006.

TECHNICAL FIELD

The technical field substantially corresponds to devices and methods in USPTO class 235 under one or more of subclasses 375, 379, 380, and 382. An exemplary embodiment relates to card activated cash dispensing automated banking machines associated with a banking system. Specifically, exemplary embodiments relate to an apparatus and method for producing and configuring customized card activated cash dispensing automated banking machines.

BACKGROUND

Automated banking machines are well known. A common type of automated banking machine used by consumers is an automated teller machine ("ATM"). Automated banking machines enable customers to carry out banking transactions. Common banking transactions that may be carried out with automated banking machines include the dispensing of cash, the receipt of deposits, the transfer of funds between accounts, the payment of bills, and account balance inquiries. The types of banking transactions a customer can carry out are determined by capabilities of the particular banking machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip, or travelers checks. For purposes of this disclosure an automated banking machine or automated transaction machine shall encompass any device which carries out transactions including transfers of value.

Automated banking machine platforms often have the ability to perform various types of transaction functions depending on the types of software applications that are installed on the machine. Thus one automated banking machine may be operatively configured with software to perform only certain banking transactions such as cash dispensing, while another automated banking machine with generally similar physical hardware can perform additional transactions such as bill payment by installing additional automated banking machine software (and sometimes hardware) components.

Automated banking machines often are manufactured with a limited set of pre-installed automated banking machine software components with a standard set of default features. When additional features and capabilities for an existing automated banking machine are desired, a service technician ("servicer") may access a service area or function of the automated banking machine which enables the servicer to install additional software and/or hardware components which provide the additional desired functionality for the automated banking machine. Examples of systems and procedures for installing and configuring software on an automated banking machine are shown in U.S. Pat. No. 6,672,505 of Jan. 6, 2004, U.S. Pat. No. 7,063,253 of Jun. 20, 2006, and U.S. application Ser. No. 11/169,295 filed Jun. 28, 2005, the disclosures of which are hereby incorporated herein by reference.

Software is often installed from portable media such as CD-ROM and DVD disks. A problem with this approach is that it is often labor intensive to manually install and configure new software on automated banking machines. A further drawback is that software installed in this manner is often difficult to track for purposes of ensuring that the software complies with all applicable software licenses. Thus there exists a need for a new process of installing software on an automated banking machine, which process is more efficient and minimizes the opportunity for unlicensed software to be installed on the automated banking machine.

BRIEF SUMMARY

It is an object of at least one embodiment of at least one invention described herein to provide an automated banking machine that may be selectively configured.

It is a further object of at least one embodiment to provide a method of configuring an automated banking machine.

It is a further object of at least one embodiment to provide a method of configuring an automated banking machine to include properly licensed software.

Further objects of one or more embodiments will be made apparent in the following Detailed Description and the appended claims.

The foregoing objects may be accomplished in an embodiment of a method of configuring a card activated automated banking machine such as an ATM that includes output devices such as a display screen, speakers, and a receipt printer. The automated banking machine also includes input devices such as a card reader, touch screen, keypad and/or function keys. The automated banking machine further includes transaction function devices such as a dispenser mechanism for sheets of currency, a depository mechanism, and other transaction function devices that are used by the machine in carrying out banking transactions. In addition, the automated banking machine may include communication devices, such as networking components which enable the machine to communicate with other machines such as a host banking system across a wired or wireless network.

The automated banking machine may include at least one computer. The computer is in operative connection with the output devices, the input devices, the communication devices, and the transaction function devices in the machine. The computer is operative to execute a plurality of software applications stored in a local data store such as a hard drive, flash memory, or other application storage medium. Such software applications may include an operating system. Such software applications may also include automated banking machine software that is operative to provide the computer with the programming necessary to cause the machine to carry out a plurality of different transaction functions.

As used herein, software applications and their associated components installed in an automated banking machine are referred to as software components. Based on the desired functionality for the machine, one or more of the software components may be selectively configured on the automated banking machine. As used herein, the term "configure" with respect to software encompasses the processes associated with either or both of configuring existing software already installed on an automated banking machine and installing software so as to enable instructions to be available for use by a computer processor of the automated banking machine.

An exemplary embodiment includes a method of manufacturing customized automated banking machines. This method may include mounting (at a first location) a plurality of hardware devices to an automated banking machine responsive to order data associated with an order for the automated banking machine. Such an order may correspond to a purchase or lease of one or more automated banking machines by a customer. The hardware devices may include a card reader, a cash dispenser, at least one processor, at least one hard drive, at least one input device, and at least one output device. Such devices may be installed in operative connection with at least one of a housing, frame, chest, and fascia of the machine. The order data may include at least one hardware part number corresponding to at least one of the devices. The order data may also include at least one software part number corresponding to at least one software component. In addition, the order data may include at least one customization part number corresponding to at least one customization file provided by the customer and/or created for the customer.

Each automated banking machine associated with an order will include at least one hard drive or other storage device mounted therein that is capable of storing the at least one software component associated with the order. In an exemplary embodiment, the method may further include installing, responsive to the order data, the at least one software component on the at least one hard drive or other storage device through operation of at least one server. In addition, the method may include installing, responsive to the order data, the at least one customization file on the at least one hard drive or other storage device, through operation of the at least one server.

In an exemplary embodiment, the order data may be stored on the at least one hard drive or other storage device as well. In such a case, installation of the at least one software component and the at least one customization file may be carried out by the at least one server responsive to the order data previously stored on the at least one hard drive or other storage device. However, in an alternative embodiment, installation of the at least one software component and the at least one customization file may be carried out by the at least one server responsive to order data accessed locally or from a remote server.

In an exemplary embodiment, the at least one server may retrieve at least one customization image responsive to the order data. The customization image may include a plurality of customization files which are installed on the at least one hard drive or other storage device. Such customization files may include at least one of an image file, a video file, a sound file, or any other file which is operative to provide the automated banking machine with customized visual and/or audible output features desired by the customer. The customization image may be retrieved from a server located remotely from the first location.

To produce the customization image, the method may further comprise acquiring, or collecting for a customer associated with the purchase order, the plurality of customization files intended for the customization image. The method may include storing these files as part of a customization image on the remotely located server. The method may also include generating the customization part number and including the customization part number in the order data. In addition, the method may include storing data in a data store corresponding to an association between the customization part number and the customization image. In this described embodiment, the at least one server may access the data store using the customization part number to retrieve the customization image intended to be stored on the hard drive or other storage device.

These described method steps for installing the at least one software component and the at least one customization file on the hard drive or other storage device may be carried out either prior to or after the hard drive or other storage device is mounted in the automated banking machine. Also the described method may include installing testing utilities on the hard drive. After the hard drive is mounted in the machine, the testing utilities may be executed in the processor of the machine to test the hardware components mounted in the machine. For example the method may include testing the card reader and the cash dispenser mounted in the automated banking machine.

The at least one software component may include a plurality of software components installed on the hard drive or other storage device. Also the at least one server may install other software components on the hard drive or other storage device in addition to the at least one software component associated with the order data. At least one of these software components may include configuration software. Such configuration software may be operative to configure other software components installed on the hard drive or other storage device. Thus before or after the hardware components have been tested, the method may include executing the configuration software in the processor of the machine. Such configuration software may configure one or more of the other software components and/or the at least one customization file to provide the ATM with a software installation capable of carrying out financial transaction for consumers.

For example a plurality of the software components may correspond to setup programs, and script files and other components that are capable of being executed in the processor of the machine. The configuration software may sequentially run such software components to complete the configuration of software on the automated banking machine.

In an exemplary embodiment, the method may further include transporting the automated banking machine to a second location remote from the first location. The first location may correspond to a factory where the machine is initially manufactured. The second location may be in a different geographical location and may correspond to a secondary staging facility. At least one further server at the second location may operate responsive to the order data to update at least one software component and/or the at least one customization file on the at least one hard drive or other storage device. The method may include operating the previously described configuration software in the processor of the automated banking machine to configure the new software components and/or customization files installed on the hard drive or other storage device.

In an exemplary embodiment, the at least one hard drive or other storage device may include at least two partitions. In such an embodiment, the at least one software component and the at least one customization file may be installed on a first partition, while the test utilities and/or order data are stored on a second or third partition. In this described embodiment, the at least one further server at the second location may be responsive to the order data on the second partition to update the at least one software component and/or at least one customization file on the first partition.

In addition, an exemplary embodiment of the method may include testing the assembled and customized software on the automated banking machine. Testing may include causing the at least one cash dispenser to operate to dispense real or simulated cash, through operation of the at least one processor responsive to the at least one software component installed on the hard drive or other storage device in the machine. Testing may also include verifying that the machine operates properly responsive to the at least one customization file. If the customization file corresponds to an image file, testing may include operation of the at least one processor responsive to the at least one software component and the at least one image file, to cause the output device of the machine to output a visual output representative of the image file.

DETAILED DESCRIPTION

Figure 1:
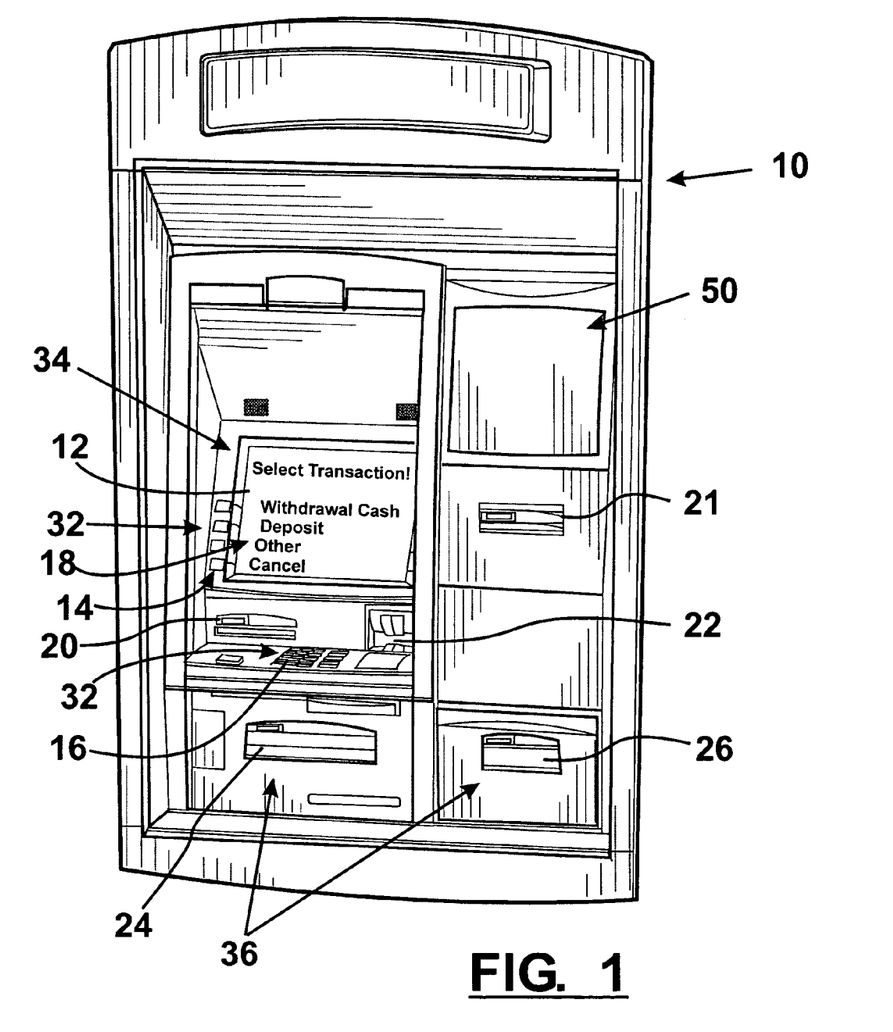
FIG. 1 is a perspective view representative of an automated banking machine.

Referring now to the drawings and particularly to FIG. 1, there is shown therein a perspective view of an automated banking machine or an ATM 10 of one exemplary embodiment. The automated banking machine 10 includes at least one output device 34 such as a display device 12 that is operative to provide a consumer with a user interface 18 that includes a plurality of selectable options for operating the machine. The embodiment may further include other types of output devices such as speakers, a receipt printer 20, or any other type of device that is capable of outputting visual, audible, or other sensory perceptible information.

The automated banking machine 10 may include input devices 32 such as an encrypting PIN (personal identification number) pad with keypad 16 and function keys 14 as well as a card reader 22. The card reader is operative to read data on bearer records such as user cards. The data on such cards may correspond to users and/or financial accounts. The exemplary embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The exemplary embodiment of the automated banking machine 10 may further include a plurality of transaction function devices which may include, for example, a cash dispenser 24, a depository mechanism 26, cash recycler mechanism, or any other type of device which is operative to perform transaction functions involving transfers of value.

Figure 2:
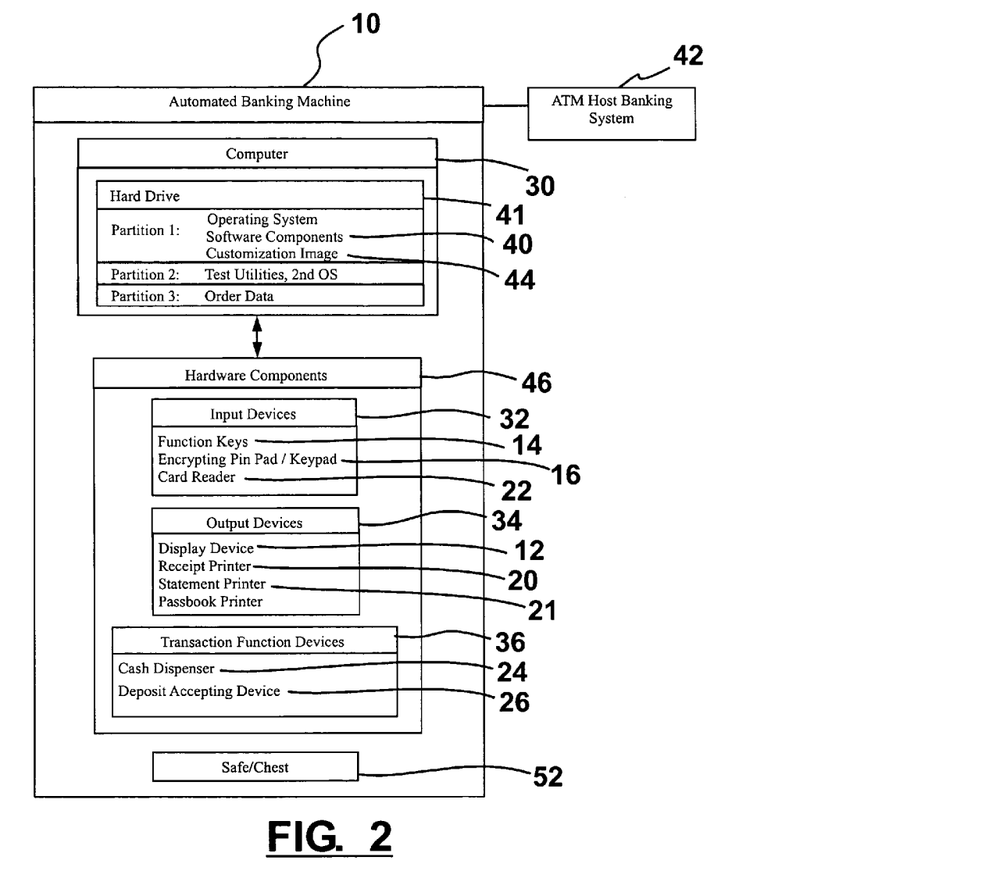
FIG. 2 is a schematic view representative of an exemplary embodiment of an automated banking machine.

FIG. 2 is a schematic representation of components which may be included in the automated banking machine 10. The machine 10 may include at least one computer 30. The computer 30 may be in operative connection a plurality of hardware devices 46 in the machine, such as the input device(s) 32, the output device(s) 34, and the transaction function device(s) 36. The computer 30 may be in operative connection with other types of hardware devices used in the operation of the machine, such as communication devices, sensors, lights, motors, actuators or other mechanisms and devices mounted in the machine. In an exemplary embodiment, the automated banking machine may also include a chest 52 that is operative to securely store cash, deposits, and/or other items of value.

The described embodiment of the automated banking machine may further include software components 40 operative in the computer 30. Such software components may include terminal control software components that are operative to control the operation of the machine by both consumers and other authorized users such as service technicians. For example, such terminal control software components may include applications which enable a consumer to dispense cash, deposit a check, and/or perform other transaction functions with the machine. In addition, the terminal control software components may include applications which enable a service technician to perform configuration, maintenance, and diagnostic functions with the machine.

The computer 30 of the ATM may include at least one storage device 41. Such a storage device may correspond to a hard drive or other device that is operative to store software files comprising computer executable instructions in an ATM. For example in an alternative embodiment, the storage device may correspond to a flash memory device, an optical storage device, or any other type of device which is capable of storing computer readable data usable by the computer in the ATM. In an exemplary embodiment, the hard drive or other storage device in the ATM is used to store the previously described software components 40, an operating system, and other types of files and/or data which are described subsequently in more detail. Also, in an exemplary embodiment, the hard drive may be divided into a plurality of logical or virtual partitions capable of segregating files on the hard drive.

Exemplary embodiments of the automated banking machine 10 are operative to communicate with a transaction processing server which is referred to herein as an ATM host banking system 42. Such an ATM host banking system 42 is operative to authorize the automated banking machine 10 to perform transaction functions for users. Such transaction functions may include, for example, withdrawing cash from an account through operation of the cash dispenser 24, depositing checks or other items through operation of the depository mechanism 26, performing a balance inquiry for a financial account and transferring value between accounts.

Automated banking machines such as ATMs may be configured differently with different devices and different software depending on the needs of the entity purchasing the ATM. In general, the process of producing ATMs customized to fulfill the needs of a financial institution or other entity starts with the sale of the ATMs. Such a sale typically generates an order including order data that specifies the desired features for the ATMs being purchased. Such features may correspond to hardware devices that are to be included in the ATMs. Such features may also correspond to software components that are to be installed in the ATM. Each of the different hardware devices and software components required for the ATM may be associated with different part numbers which are included in the order for the machine. Examples of software components that may be associated with part numbers include an operating system and terminal control software applications.

Figure 3:
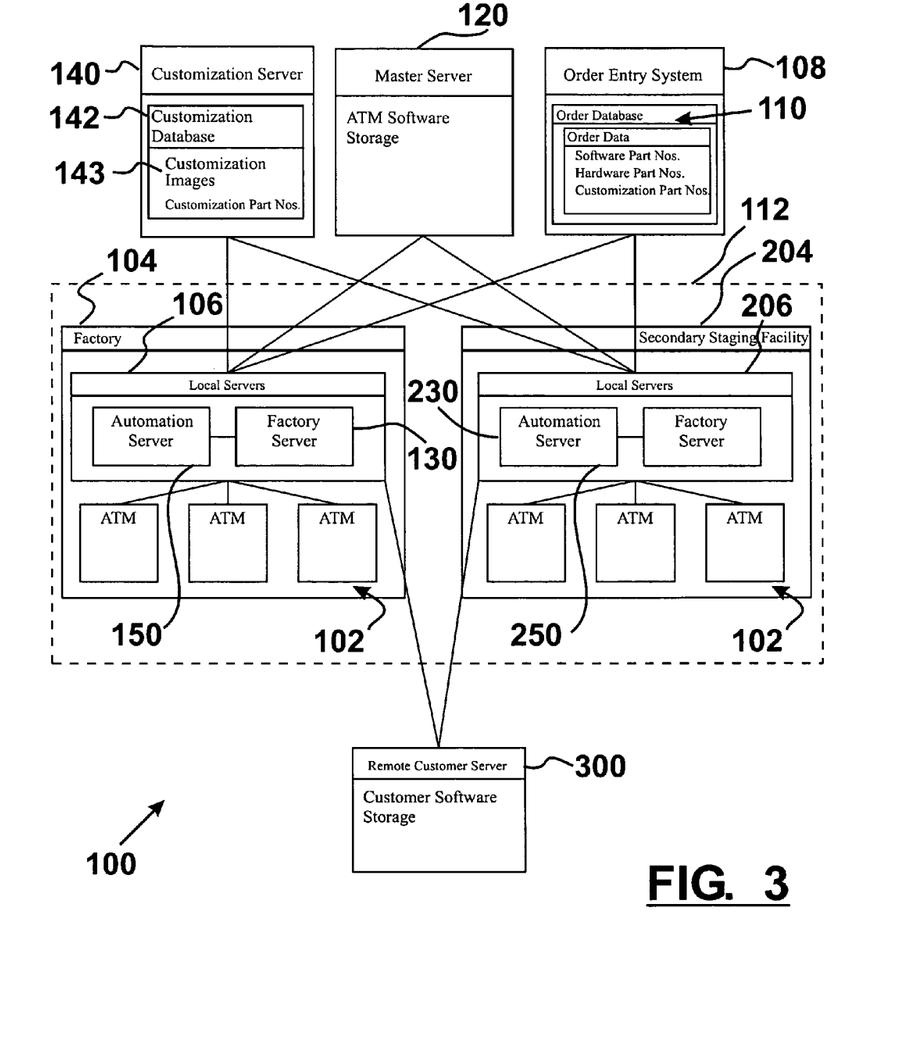
FIG. 3 is a schematic view representative of a system for customizing automated banking machines during the manufacture of the machines.

During the manufacture of the ATM, an exemplary embodiment includes carrying out a process which includes manually and/or automatically installing the required devices and software components specified in the order for the machine. FIG. 3 shows a schematic view of an embodiment of a system 100 for manufacturing ATMs. In this described embodiment, a plurality of ATMs 102 may be built at one or more factory locations 112. Such factory locations may include an initial factory 104 that includes an assembly line and/or a staging area at which ATMs are built. Such factory locations may also include a secondary staging facility 204 at which assembled ATMs are further customized or configured.

During the initial assembly of an ATM at a factory 104, hardware devices may be individually mounted to an ATM frame. Such devices mounted to the ATM frame may include a default set of hardware components. This default set of components comprises a base hardware configuration for the particular model of ATM being assembled. Such devices mounted to the ATM frame may also include those hardware components that correspond to the hardware part numbers included in the order for the machine.

To install software on the ATM, an exemplary embodiment may include the step of operatively connecting the ATM and/or a hard drive of the ATM to at least one local server 106, 206 in the factory 104, staging facility 204, or other factory location 112. The at least one local server may be operative to provide the software required to be installed and/or loaded onto the hard drive or other storage device of the ATM. Such software may include a default set of applications common to a base software configuration for the particular model of ATM being assembled. Such software may also include software components which correspond to software part numbers included in the order for the machine. In an exemplary embodiment, the local server provides the software components responsive to data associated with the order for the machine. Data corresponding to the order may be retrieved by the local server from at least one further server 108 remote from the factory. Such a further server may correspond to an order entry system comprising an order database 110 or other server and/or data store operative to store data representative of an order and part numbers included in the order.

In an exemplary embodiment, when an ATM order is generated and stored in the order database 110, the order may be evaluated to determine if the ATM will include customized software, customized files, and/or customized configuration data that deviates from a default set or base configuration of software components. Each customization may be assigned a new customization number, referred to herein as a customization part number. In an exemplary embodiment, after the customization part number has been generated, the customization part number may be stored in the database 110 in association with the order. As a result, the order stored in the database 110 may include hardware part numbers, software part numbers, and one or more customization part numbers.

In addition to generating new customization part numbers and associating the part numbers with an order, the described embodiment may also include associating the new customization part numbers with sets of customization files used to configure the ATM. Such a set of customization files is referred to herein as a customization image 44. Such an image may correspond to a collection of files stored as a group. For example, a customization image may correspond to a single archive file or a record that includes the collection of customization files stored therein. Also, a customization image may correspond to a set of customization files stored in a common folder or otherwise stored in a manner that enables the collection of customization files to be accessed as a set.

In an exemplary embodiment, the customization files included in a customization image may include graphic files (e.g., bitmaps, JPEG files, and other types of image files), video files, sound files, voice files, or any other files that may be used to customize the user interface or other aspects of the operation of the ATM. Typically such customization files are provided by the customer and may include customer specific identifying indicia such as a name, logo, or trademark associated with the customer. However, one or more of the customization files may be prepared by the manufacturer of the automated banking machine or other entity for use on ATMs purchased by the customer.

A customization image may also include one or more configuration files for software applications installed on the ATM. Although in some embodiments the customization image may include executable software applications as well, in other embodiments executable software applications may not be included in the customization image. Rather, the customization image may be limited to including customized files (e.g., graphical files, voice files, and configuration files) that are used by executable software applications (e.g., terminal control software applications) in the operation of the ATM.

In an exemplary embodiment, a customization image 143 comprising a plurality of customization files may be stored on a customization server 140. The customization server may include a customization database 142, which includes records associating the customization part numbers for orders with respective customization images. The association between the customization image and the customization part number may be created in one or more customization records stored in the customization database. In an exemplary embodiment, the customization image may be stored in a field of a customization record in the customization database. In an alternative embodiment, the customization image may be stored on a file server which is identifiable by file name (or folder name) from information stored in a customization record in the customization database 142.

In the described embodiment, the customization record which associates the customization image to a customization part number may further specify particular software components and/or versions of the software components that are to be added (or subtracted) from a default set of ATM software components.

A customization record may also include other information associated with an order. Such other information stored in the configuration record may, for example, identify other aspects of the order such as the location or description of customer sites that will have ATMs with the specified customization. In this described embodiment, the customization database 142 stores customization records for a plurality of orders for different customers.

In an exemplary embodiment, generating the customization image for storage on the customization server may include gathering or acquiring customization files and configuration from the customer or other entity for including in the customization image. In addition, embodiments may further include creating and/or programming scripts capable of properly installing the files and/or data included in the customization image on an ATM. Such scripts may be incorporated into batch files, or installation files, or other software that is capable of executing on the ATM and/or the local server which operates to cause the customization files and/or customization data to be copied to the appropriate locations on the ATM (e.g., directories, folders, registries, databases, and/or other locations on the hard drive and/or other storage areas on the ATM). Such scripts may be included in the customization image.

In addition, documentation regarding the customization image may also be prepared for the customization image and/or customization scripts. Such customization documentation may be useful to assist a technician with using the customization scripts and/or carrying out disaster recovery if the customization image must be reinstalled in the field as part of a disaster recovery process. Such customization documents may be included in the customization image.

In an exemplary embodiment, the generation and/or acquisition of the customization files, customization scripts, and customization documentation may be carried out by a customization team once an ATM is sold and an order for a new ATM is generated. Such a team may further perform testing on each customization file and associated customization scripts prior to making the customization available to the factory responsible for manufacturing the ATM.

In an exemplary embodiment, ATMs may be built and configured in a number of locations (e.g., factories, assembly lines, staging areas) before being shipped to a customer location. Each of these locations may include one or more local servers 106, 206. Such local servers may include an automation server 150, 250. The automation server may be operative to load software applications and a customization image onto a hard drive or other storage device of an ATM. Such an automation server may be operative to access the customization database 142 and retrieve data stored in a customization record for a particular order. If a customization record and/or a customization part number do not exist for a particular order, the automation server may install a predetermined default set of software components (also referred to herein as a software stack) on a newly manufactured ATM. Such a default software stack may correspond to the latest released version of ATM software that is operative for use on the particular model of ATM being configured.

If the automation server is able to retrieve a customization part number for an order from the customization database, the automation server is operative to retrieve the corresponding customization image specified by the customization record. In an exemplary embodiment, such a customization image may be retrieved from the customization database. However, in alternative embodiments, the customization image may be retrieved from a further location referenced by the customization record, such as a referenced file or directory on a file server or other server operative to store customization images.

In addition to retrieving a customization image for an order, the automation server may also determine from the customization record whether specific versions of particular software components are required to be installed on the ATM. If specific versions of software are not required, the automation server is operative to install on the ATM the default ATM software components (e.g., operating system and terminal control software applications) and any files included in the customization image. If specific versions of software are referenced in the customization record, then the automation server is operative to adjust the default set of software being loaded on the ATM to include the particular versions of the software components specified in the customization record for the order. For example, such particular versions referenced in a customization record may correspond to an older release of a terminal software application which has been previously certified by the customer.

In an exemplary embodiment, the software components (and different versions of the software components) available to be installed on an ATM may be stored on a data store in operative connection with a master server 120. Such a master server may correspond to a repository for the software needed for generating a default set or base configuration of software applications on an ATM. The master server 120 may be accessible via a network by each of the factory locations 112.

Software components required to be installed on ATMs may be retrieved from the master server 120 by the automation servers at each factory location. However, in other embodiments, the local servers 106, 206 may include a factory server 130, 230 which is operative to store copies of the software components also stored on the master server 120. When new software components and/or versions of software components become available on the master server, an embodiment may include a step of updating the plurality of factory servers to include the new software components and/or versions of software components. In this described embodiment, the automation server may retrieve the required software components and/or versions of the software components from the copies of software stored on the factory server 130, 230 at the same location.

In the described exemplary embodiment, each factory server may be configured to automatically retrieve/receive the latest updates to the software components from the master server on a periodic basis. The timing of the updates to the software components on the factory servers may be synchronized such that all factory servers have the same set of software components for the same corresponding date. For example, each factory server, at midnight local time, could be configured to receive an updated set of software components. As a result, regardless in which time zone an ATM is built, for any specific date, all ATMs manufactured around the world on that date will have access to the same set and versions of software components on their respective factory servers. In an alternative embodiment, all the factory servers may be updated with the latest software components from the master server at about the same time or at different times, depending on the needs of the location that includes a factory server.

The exemplary automation servers 150, 250 may include automation software which causes the automation server to install the customized image and the software components on a hard drive or other storage medium of an ATM. Such automation software may be revised from time to time as the types of software packages and customization files change over time.

The master server and/or factory servers may also include the latest versions and/or older versions of automation software. In addition to software components for ATMs, the factory servers may also retrieve/receive copies of the automation software from the master server. The automation servers may then retrieve/receive the latest versions (or older versions if needed) of the automation software from the factory servers.

In an exemplary embodiment, when new updates or revisions to ATM software components or automation software are ready for release to manufacturing, the updated software may be stored on the master server. The factory servers in different locations may then retrieve/receive copies of the updated software components from the master server to enable automation severs at locations around the world to have access to the same latest versions of software.

The hard drive of each ATM may be configured to have a plurality of different partitions. The automation server may be operative to install a bootable operating system, ATM terminal control software components, and customization files from the customization image on a first partition. In an exemplary embodiment, a second operating system and a plurality of test utilities may be installed on a second partition of the hard drive. The test utilities are operative to test the operation of hardware components installed in the ATM during the manufacturing process. Once the testing of the ATM hardware is complete, the boot partition containing the test utilities may be deleted from the hard drive. At this point the newly manufactured ATM is ready to be shipped to a customer site or another factory or location referred to as a secondary staging facility.

In an exemplary embodiment the data corresponding to an order may be stored on the second partition along with the test utilities or in another storage location accessible to the automation server. For example, in other embodiments, the hard drive of the ATM may include a third partition. The third partition may include data corresponding to the order for the machine. In these described embodiments, the order data may be stored in an order file. Such an order file may include the part numbers for the hardware and software applications that must be installed on the ATM. The order file may also include the customization part number.

The automation server 150 at the factory 104 may be operative responsive to the customization part number stored in the order file on the hard drive to access the customization record corresponding to the ATM. The automation server may be responsive to the data in the customization record and the software part numbers included in the order file to install the correct versions of software components and the correct customization files on the first partition of the hard drive. The order file may be removed once testing of the ATM hardware is complete. Also, the order file may remain on the hard drive for later use by another automation server at another factory location 112 to determine the proper software to upgrade and/or reinstall on the ATM.

For example, additional configuration of the ATM may be carried out at another factory location 112 such as a secondary staging facility 204. A secondary staging facility 204 may be located remotely from the factory 104 at which the ATM is initially manufactured. Because the amount of time between the initial manufacture of the ATM and the time the ATM is staged at a secondary staging facility may vary from days to months, the required software installed on the ATM may need to be updated. To update the ATM at the secondary staging facility, the ATM may be connected to a secondary automation server 250 at the secondary staging facility 204. The secondary automation server 250 may be operative to analyze the ATM and determine whether it meets the current requirements for the customer. Analyzing the ATM may include determining whether particular versions of files and other components installed on the ATM correspond to the current data in a customization record for that particular machine. Analyzing the ATM may also include determining whether particular versions of files and other components installed on the ATM include the latest patches and service releases.

For example, the secondary automation server 250 may determine that new operating system patches must be installed or that a newer customization file exists and must be loaded on the ATM. In such cases, the automation server may operate to install the patches, updates, and/or additional files on the ATM. In addition, the secondary automation server may determine that the default software setup on the ATM does not correspond to the latest specified version of a default software setup. In such cases, the secondary automation server 250 may reinstall all of the software components on the hard drive of the ATM responsive to the customization data retrieved from the customization database 142 for the machine and responsive to data representative of the latest specified versions of default software available for installation on ATMs.

As described previously, a customization image may include configuration files which are loaded onto the ATM by the automation servers. In some embodiments, the customization records may include data representative of hardware and/or software settings for the ATM. The automation server may be operative responsive to such hardware and software settings in the customization records to further configure the hardware and/or software installed on the machine. Also, the automation server may be operative to verify part numbers of hardware devices and/or the model number of the ATM included in the order data associated with the machine to determine and configure the software installed on the machine for use with the particular hardware devices installed on the ATM. For example, if the automation server determines that a part number corresponding to a depository mechanism is included in the order for the machine, the automation server may be operative to configure the software installed to properly use the depository mechanism.

In addition, in alternative embodiments, the customization data stored in the customization database may include site specific data needed by an ATM, which data is to be installed at a predetermined site or in a predetermined network. Examples of site information may include a POLL ID, IP address, terminal name, and/or other information which may be different from ATM to ATM depending on the intended final operating location of the specific ATM being configured. The automation server may be responsive to such site specific data retrieved from the customization database to configure the corresponding site information stored on the ATM.

In further embodiments, the automation server may be operative to evaluate the order file on the hard drive to determine the type of hardware devices installed on the ATM. The automation server may be responsive to the determined type of hardware devices to configure software installed on the machine to operate correctly. For example, the automation server may be operative to determine the type of card reader (motorized or manual swipe) installed on the ATM. Responsive to the determined type of card reader, the automation server may be operative to configure voice generation software installed on the ATM to be able to output an accurate description of how to use the card reader for use by a consumer who is visually impaired. For example, the automation software may configure the ATM to verbally output the phrase "please insert card" for a motorized card reader installed in the machine or the phrase "please swipe card" for a manual swipe card reader installed in the machine.

The automation server may be operative to determine the model number of the machine from the order file. The automation server may be responsive to the model number to configure the ATM to verbally output the correct location of devices on the ATM. For example, various models may include the card reader in various locations relative the display device of the ATM. Responsive to the model number, the automation server may configure the ATM to verbally output the sentence, "Please insert card in the card reader located to the right of the display screen," or "Please insert card in the card reader located below the display screen."

In alternative embodiments, the data representative of the type of hardware devices and/or model number of the ATM may be stored in a customization record or in a file included in the customization image associated with the order for the machine. For example, configuration files may be included in the customization image, which files specify how the automation server should configure software components to enable the ATM to output a proper description of how to use a device and/or the location of the device on the machine. The configuration files included in the configuration image may be generated responsive to the order data stored in a database rather than order data stored in an order file on a hard drive of the ATM.

In further embodiments, the automation server may be operative to install customer provided executable software applications on an ATM responsive to data stored in the customization record for an order. Such customer provided software may have software licenses associated therewith that limit how such customer provided software is installed. In such cases, the method for installing such customer provided software may be different from the installation for software provided by the ATM manufacturer or the installation of customization files provided by the customer.

For example, the ATM manufacturer may have authorization to store multiple copies of a particular software component on the master server and on a plurality of factory servers. However, the license associated with the customer provided software application may not allow copies of the software to be stored on servers of a third party. As a result, the automation server may be operative to cause an alternative method of installing the customer provided software to be carried out which does not violate the license for the customer provided software. Examples of customer provided software may include an operating system, third party application software, anti-virus software, firewall software, networking software, Virtual Private Network (VPN) software, and any other software that the customer may wish to provide for installing on the ATM.

An example of an alternative method of installing customer provided software may include connecting the ATM to a further server 300 provided by the customer, which server is operative to provide and/or install the customer provided software. Such a customer server 300 may be located at the location at which the ATM is being configured. Also, such a customer server may be remote from the location at which the ATM is being configured (e.g., may be located at a facility under the control of the customer). A network connection to a remote customer server may increase the risk of unauthorized software such as worms and viruses being installed on the ATM. To minimize this risk, monitoring software may be used which is operative to only permit authorized communications and/or authorized software to be transferred between the remote server and the ATM.

For example, the customer provided software transferred between the customer server and the ATM may be associated with a hash value. Such a hash value may be stored in association with the customization record or elsewhere in a form that is accessible by the monitoring software. The monitoring software may generate a further hash from the software received from the customer server. This further hash may be compared with the previously stored hash corresponding to the software to verify that it is authorized to be installed on the ATM. In other embodiments, digital signatures associated with the customer provided software may be authenticated prior to permitting the customer provided software to be installed on the ATM. Of course these approaches are exemplary.

In an exemplary embodiment, the automation server may be operative to generate a log that includes data representative of the files installed on the ATM. Such a log may include a listing of customization files, software components, operating system components, patches, custom hardware and software configuration settings, and any other detail of the configuration of the machine carried out by the automation software.

Once the ATM is installed in its final location at a customer site, it may become necessary to reinstall the software in the field. To enable the ATM to be reconfigured correctly, in an exemplary embodiment, the customization image may be accessible through a web page by a technician in the field. The technician may download the customization image corresponding to the ATM and install it on the ATM.

In an exemplary embodiment, auditing software components may be used to ensure that the software components, hardware devices and customization file associated with an order are consistent with each other and with the capabilities of the factory or secondary staging area at which the machine will be built and customized. For example, auditing software may be operative to determine whether or not an order entered in an order entry server 108 for the purchase of one or more ATMs specifies software that is not yet available in the master and factory servers. The auditing software may also be operative to track the number of licenses of a particular software package that have been previously purchased or otherwise associated with a customer, in order to determine if the number of software packages included on orders complies with the number of purchased licenses for the software package. Such auditing software may be operative to cause one or more computers to automatically send notification messages to specified contacts in the sales, order entry, and/or manufacturing process of any inconsistencies that are found. In an embodiment, the factory may be responsive to an order that is flagged as having inconsistencies by the auditing software to cause the order to be delayed from being assembled.

In an exemplary embodiment, the software, customization image, and configuration data for an ATM may be installed on the hard drive or other storage device prior to the hard drive or other storage device being installed in the ATM. For example, prior to or during the assembly of an ATM at the factory 104, the intended hard drive for the ATM may be connected to a load station which corresponds to or is in operative connection with the described automation server 150. The automation software described previously may operate to initiate the installation of the terminal software, operating system (OS) files, customization files, and associated configuration data on a first partition of the hard drive responsive to the order data for the particular ATM. In addition, while at the load station, test utilities may also be installed on the second partition of the hard drive.

Before disconnecting the hard drive from the customer load station, the hard drive may be imaged (e.g., copied) and the image of the hard drive may be stored on a server, CD, DVD, or other storage location or article for use as a backup. Images of the files on the hard drive stored on a removable media article such as a CD or DVD disk may be shipped with the ATM for use in recovering the software after a hard drive failure.

When the ATM is being built, the hard drive previously configured at the load station for the ATM may be installed in the ATM. The second partition associated with the test utilities may be configured to boot first. The machine may be booted from this second partition and the test utilities may be configured to automatically (or manually) test the hardware devices installed on the ATM. If all of the hardware devices work properly in response to the operation of the test utilities, the second partition may be deleted and/or reformatted to remove the test utilities and associated bootable OS from the hard drive.

Once the test utilities are removed, the ATM may be booted off the OS on the first partition that includes the software files, customization files, and configuration files loaded by the automation software at the load station. One or more of the many files installed on the hard drive may include configuration software that is capable of installing, configuring and/or executing one or more of the other software components loaded on the hard drive.

For example, one or more of the software components installed on the hard drive may correspond to a setup program, script file, or archive file (e.g., setup executable files, batch files, InstallShield™ files, Pearl™ files, and zip files) that need to be executed or expanded to complete the configuration of the software on the ATM.

The configuration software executed upon booting the OS on the first partition of the hard drive may be operative to serially install each of the setup/script/archive programs in an order specified by data stored on the hard drive and/or by any other mechanism to ensure software is loaded in a pre-determined order. For example, setup programs needed to be installed may be stored in a predetermined directory and may be associated with or named with alphanumeric characters which are used to determine the order (e.g., alphanumeric by file name) in which they are installed by the configuration software. After a software program in the predetermined directory has completed successfully, the configuration software may be operative to move the installed setup program to another folder on the hard drive or otherwise to archive it so that the software is not re-installed upon the next re-boot of the ATM. The configuration software then moves on to the next setup program, script, or archive file (in alphanumeric order) in the predetermined directory to execute and/or expand. The configuration software and/or the programs executed by the configuration software may be operative to re-boot the software multiple times during the installation of all of the files in the predetermined directory.

In an exemplary embodiment, the configuration software and/or the software programs installed by the configuration software, may be operative to execute without user intervention. For example, the configuration software may be operative to force unsigned drivers to be installed without requiring inputs from a technician. The configuration software may also be operative to automatically log into the OS via an appropriate administrative username and password. If a problem is detected with the installation, the configuration software is operative to stop the installation and generate an output informing a technician of the problem. The configuration software may also be capable of importing configuration data on the hard drive and configuring software on the ATM responsive to the configuration data. The configuration software may also be operative to remove existing installed software components responsive to scripts and/or uninstall programs present in the predetermined directory.

Once the ATM is configured, it may be connected to a test server in the factory. The ATM may then be operated to re-boot or otherwise operated to execute terminal control software to test out one or more transactions with a test host system. The configuration software may remain on the ATM when the ATM is moved to a secondary staging facility 204 and when the ATM is placed in service at a customer's site. Thus when updates are needed as determined by an automation server at the secondary staging facility or by a remote management utility on the ATM at a customer's site, the update components may be placed in the predetermined directory discussed previously, and the configuration server is operative to execute the updated components so as to properly install the updated software on the hard drive of the ATM.

In an exemplary embodiment, the ATM may include a remote management agent software application that executes in the ATM while the machine is in service. The remote management agent software may provide for execution, installation, activation, and or deactivation of software that is downloaded on the ATM in the field. In an exemplary embodiment, the remote management agent software may include or may be operative to execute the previously described configuration software to configure the ATM according to data and/or files remotely acquired by the remote management software from a remote server. Also, the remote management agent may include or be associated with a reboot manager that is operative to prevent an in-service ATM from rebooting responsive to a software update until an appropriate time is available (e.g., when the ATM is not being used by a consumer to carry out financial transactions).

Some embodiments of an ATM may include a computer with a motherboard that includes a trusted platform module (TPM). Examples of ATMs that are configured to use a TPM are shown in U.S. patent application Ser. No. 11/444,957 filed May 31, 2006, which is hereby incorporated herein by reference. TPMs may include one or more digital certificates, private keys, and/or passwords which enable the TPM to perform cryptographic functions which enhance the security of the ATM. Specifying or acquiring one or more digital certificates, private keys, and/or passwords for a TPM may be referred to as taking ownership of the TPM. In an exemplary embodiment, the method of customizing an ATM as described previously may further include a process of taking ownership of the TPM.

This process may include installing and executing service software including TPM configuration software associated with the TPM on a hard drive of the ATM. For example, such TPM configuration software may be included on the previously described second partition of the hard drive along with the previously described test utilities. Also, the TPM configuration software may be installed on the second partition after the test utilities have been removed from the second partition. In other embodiments, the TPM configuration software may be installed on a further or third partition.

In an exemplary embodiment, the TPM configuration software may include a TPM driver, a Trusted Software Stack (TSS), cryptography service provider software, and/or any other TPM software operative to configure a TPM and acquire certificates associated with RSA keys generated and/or stored using a TPM. In one embodiment, after the TPM configuration software has been used to configure the TPM, the TPM configuration software may be deleted from the second partition or otherwise removed from the hard drive of the ATM.

For a TPM 1.2 compliant TPM, the TPM configuration software may be operative to take ownership of the TPM by establishing a password for the TPM. During the process of establishing ownership of the TPM, the TPM may produce a number of RSA public and private keys including Storage Root Keys and Endorsement keys. The TPM configuration software may also be operative to cause the TPM to generate further RSA keys such as signature keys.

The TPM configuration software may facilitate generating certificate request messages (e.g., PKCS#10 certificate request) including, for example, the signature public keys generated using the TPM. The TPM configuration software may also facilitate communicating the certificate request messages to a Certificate Authority through a network in operative connection with the ATM and/or through communication with the factory and/or automation servers. The TPM configuration software may also facilitate receiving the requested certificates from the Certificate Authority and storing the received certificates on the ATM such as in a certificate repository on the partition that includes the ATM terminal control software components.

In an exemplary embodiment, the previously described customization record or customization image for an order may further include TPM associated data which is accessible by the TPM configuration software for use with taking ownership of the TPM. Such TPM associated data may include data to be included in the certificate request messages and generated certificates for the TPM such as the common name, organization name, address information, and/or other information that may be included in a digital certificate generated for use with a TPM.

The TPM configuration software may also be used to securely forward data associated with the configuration of the TPM to a backup database for later use in recovering the ATM after a hard drive failure or other event which destroys data stored on the ATM usable to interface with the TPM. Such backup data may include certificates, keys, and/or the owner password associated with the TPM.

In some embodiments in which the ATM is not capable of being in direct network communication with a Certificate Authority or a backup database, the TPM configuration software may be operative to store and/or retrieve certificate request messages, returned certificates, and/or TPM backup data on/from portable storage devices (e.g., USB flash drives, CDs, DVDs) placed in operative connection with the ATM. A technician may then move the portable storage device between the ATM and a further computer connected to a certificate authority or backup database through a network to facilitate acquiring certificates and/or storing/restoring TPM data for the ATM.

In an exemplary embodiment, if an ATM hard drive and/or the data on an ATM hard drive is destroyed or otherwise corrupted, the described TPM configuration software, the ATM software applications, and the customization files may be reinstalled on the ATM by a technician servicing the machine. The TPM configuration software may then be used to reinstall the TPM backup data corresponding to the ATM to return the ATM to a functional state. However, in the event the motherboard including the TPM is replaced in the ATM, the above described steps for acquiring ownership of the TPM, generating signature keys, acquiring corresponding certificates, and backing up the new TPM data may be carried out to return the ATM to a functional state.

Thus the new automated banking machine customization method and system described herein achieves at least one of the above stated objectives, eliminates difficulties encountered in the use of prior devices and systems, solves problems and attains the desirable results described herein.

In the foregoing description certain terms have been used for brevity, clarity and understanding; however, no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof. The description of the embodiment included in the Abstract included herewith shall not be deemed to limit the invention to features described therein.

Having described the features, discoveries and principles of the invention, the manner in which it is constructed and operated, and the advantages and useful results attained, the new and useful structures, devices, elements, arrangements, parts, combinations, systems, equipment, operations, methods and relationships are set forth in the appended claims.

We claim:

1. A method of configuring a card activated cash dispensing automated banking machine comprising:
    a) at a first location, including a plurality of hardware devices in the automated banking machine responsive to stored order data associated with an order corresponding to the automated banking machine, wherein the hardware devices include a card reader operative to read data included on user cards, a cash dispenser, at least one processor, and at least one output device, wherein the order data includes at least one hardware part number corresponding to at least one of the devices, wherein the order data includes at least one software part number corresponding to at least one software component, and wherein the order data includes at least one customization part number corresponding to at least one customization file provided by a customer associated with the order;
    b) through operation of at least one server responsive to the order data, installing the at least one software component on at least one hard drive;
    c) through operation of the at least one server responsive to the order data, installing the at least one customization file on the at least one hard drive; and
    d) including the at least one hard drive in the automated banking machine in operative connection with the at least one processor.

2. The method according to claim 1, wherein the order data is stored on the at least one hard drive, wherein in (b) and (c) the at least one server is operative responsive at least in part to the order data on the at least one hard drive.

3. The method according to claim 1, wherein in (b) and (c) the at least one server is operative responsive at least in part to order data included in a remote server.

4. The method according to claim 1, further comprising:
    e) prior to (c), retrieving through operation of the at least one server at least one customization image responsive at least in part to the order data, wherein the customization image includes a plurality of customization files, wherein (c) includes installing the plurality of customization files on the at least one hard drive.

5. The method according to claim 4, wherein the plurality of customization files includes at least one of an image file, a video file, and a sound file.

6. The method according to claim 4, wherein (e) includes retrieving the customization image from a server located remotely from the first location.

7. The method according to claim 6, further comprising:
    f) prior to (a), acquiring from a customer associated with the order the plurality of customization files;
    g) storing the customization files in the customization image;
    h) generating the customization part number;
    i) including the customization part number in the order data; and
    j) storing in a data store, an association between the customization part number and the customization image;
    wherein (e) includes accessing the data store using the customization part number to retrieve the customization image.

8. The method according to claim 1, further comprising:
    e) transporting the automated banking machine to a second location remote from the first location; and
    f) through operation of at least one further server responsive at least in part to the order data, updating at least one software component on the at least one hard drive.

9. The method according to claim 8, wherein in (e) the first location and the second location are located in geographically distant locations.

10. The method according to claim 9, further comprising:
    g) through operation of the at least one further server responsive at least in part to the order data, updating at least one customization file on the at least one hard drive.

11. The method according to claim 1, further comprising:
  e) through operation of the at least one processor in the automated banking machine responsive at least in part to the at least one software component, causing the cash dispenser to operate.

12. The method according to claim 11, wherein e) includes the cash dispenser dispensing cash.

13. A method of configuring a card activated cash dispensing automated banking machine comprising:
  a) at a first location, including a plurality of hardware devices in the automated banking machine responsive at least in part to stored order data associated with an order corresponding to the automated banking machine, wherein the hardware devices include a card reader operative to read data included on user cards, a cash dispenser, at least one processor, and at least one output device, wherein the order data includes at least one hardware part number corresponding to at least one of the hardware devices, wherein the order data includes at least one software part number corresponding to at least one software component, and wherein the order data includes at least one customization part number corresponding to at least one customization file provided by a customer associated with the order;
  b) through operation of at least one server responsive at least in part to the order data, installing the at least one software component on a first partition of at least one hard drive, wherein the at least one hard drive includes a second partition;
  c) through operation of the at least one server responsive at least in part to the order data, installing the at least one customization file on the first partition of the at least one hard drive;
  d) through operation of the at least one server, storing the order data on the second partition of the at least one hard drive;
  e) including the at least one hard drive in the automated banking machine in operative connection with the at least one processor;
  f) transporting the automated banking machine to a second location remote from the first location, wherein the first location and the second location are located in geographically distant locations from each other; and
  g) through operation of at least one further server responsive at least in part to the order data stored on the second partition of the at least one hard drive, updating at least one software component on the at least one hard drive.

14. A method of configuring a card activated cash dispensing automated banking machine comprising:
  a) at a first location, including a plurality of hardware devices in the automated banking machine responsive at least in part to stored order data associated with an order corresponding to the automated banking machine, wherein the hardware devices include a card reader operative to read data included on user cards, a cash dispenser, at least one processor, and at least one output device, wherein the order data includes at least one hardware part number corresponding to at least one of the hardware devices, wherein the order data includes at least one software part number corresponding to at least one software component, and wherein the order data includes at least one customization part number corresponding to at least one customization file provided by a customer associated with the order;
  b) through operation of at least one server responsive at least in part to the order data, installing the at least one software component on at least one hard drive;
  c) through operation of the at least one server responsive at least in part to the order data, installing the at least one customization file on the at least one hard drive, wherein the customization file includes an image file;
  d) including the at least one hard drive in the automated banking machine in operative connection with the at least one processor; and
  e) through operation of the at least one processor in the automated banking machine responsive at least in part to the at least one software component and the at least one image file, causing the output device to output a visual output representative of the image file.

15. A method of configuring a card activated cash dispensing automated banking machine comprising:
  a) at a first location, including a plurality of hardware devices in the automated banking machine responsive at least in part to stored order data associated with an order corresponding to the automated banking machine, wherein the hardware devices include a card reader operative to read data included on user cards, a cash dispenser, at least one processor, and at least one output device, wherein the order data includes at least one hardware part number corresponding to at least one of the hardware devices, wherein the order data includes at least one software part number corresponding to at least one software component, and wherein the order data includes at least one customization part number corresponding to at least one customization file provided by a customer associated with the order;
  b) through operation of at least one server responsive at least in part to the order data, installing the at least one software component on a first partition of at least one hard drive, wherein the at least one hard drive includes a second partition;
  c) through operation of the at least one server responsive at least in part to the order data, installing the at least one customization file on the first partition of the at least one hard drive;
  d) through operation of the at least one server, storing at least one test utility on the second partition of the at least one hard drive;
  e) including the at least one hard drive in the automated banking machine in operative connection with the at least one processor;
  f) through operation of the at least one processor in the automated banking machine, executing the at least one test utility.

16. The method according to claim 15, wherein the at least one software component includes at least one configuration software component, further comprising:
  g) subsequent to (f), removing the test utility from the at least one hard drive; and
  h) subsequent to (g), through operation of the at least one processor in the automated banking machine, executing the configuration software component.

17. A method of configuring a card activated cash dispensing automated banking machine comprising:
  a) at a first location that includes the automated banking machine, accessing through operation of at least one server, stored order data associated with an order corresponding to the automated banking machine, wherein the order data includes at least one hardware part number corresponding to at least one of a plurality of hardware devices capable of being installed in the automated banking machine, which plurality of hardware devices include a card reader operative to read data included on user cards, a cash dispenser, at least one processor, and at least one output device, wherein the order data includes at least one software part number corresponding to at least one software component, and wherein the order data includes at least one customization part number corresponding to at least one customization file provided by a customer associated with the order;

b) at the first location through operation of at least one server responsive at least in part to the order data, installing the at least one software component on at least one hard drive;

c) at the first location through operation of the at least one server responsive at least in part to the order data, installing the at least one customization file on the at least one hard drive; and d) at the first location, including the at least one hard drive in the automated banking machine in operative connection with the at least one processor.

18. The method according to claim 17, further comprising:

e) at the first location, including the at least one hardware device in the automated banking machine that corresponds to the at least one hardware part number included in the order data.

19. The method according to claim 17, wherein the at least one hard drive includes a first partition and a second partition, wherein in (b) and (c) the at least one software component and the at least one customization file are installed on the first partition of the at least one hard drive, further comprising:

e) at the first location, storing the order data on the second partition of the at least one hard drive;

f) transporting the automated banking machine to a second location remote from the first location; and g) at the second location, through operation of at least one further server responsive at least in part to the order data stored on the second partition of the at least one hard drive, updating at least one software component on the at least one hard drive.

20. The method according to claim 17, wherein the automated banking machine includes the plurality of hardware devices, wherein the customization file includes an image file, further comprising:

e) through operation of the at least one processor in the automated banking machine responsive at least in part to the at least one software component and the at least one image file, causing the output device to output a visual output representative of the image file.

21. The method according to claim 17, wherein the at least one hard drive includes a first partition and a second partition, wherein in (b) and (c) the at least one software component and the at least one customization file are installed on the first partition of the at least one hard drive, and further comprising:

e) prior to (d), through operation of the at least one server storing at least one test utility on the second partition of the at least one hard drive; and f) subsequent to (d), through operation of the at least one processor in the automated banking machine executing the at least one test utility.

22. The method according to claim 21, wherein the at least one software component includes at least one configuration software component, further comprising:

g) subsequent to (f), removing the test utility from the hard drive; and h) subsequent to (g), through operation of the at least one processor in the automated banking machine, executing the configuration software component.

* * * * *